(12) United States Patent
Abe (10) Patent No.: US 6,453,126 B1
(45) Date of Patent: Sep. 17, 2002

(54) SLR CAMERA WHICH CAN SELECTIVELY UTILIZE LIGHT-SENSITIVE FILM OR AN IMAGE PICK-UP DEVICE

(75) Inventor: Tetsuya Abe, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 106 days.

(21) Appl. No.: 09/608,608

(22) Filed: Jun. 30, 2000

(30) Foreign Application Priority Data

Jul. 2, 1999 (JP) ............................................. 11-188709

(51) Int. Cl.[7] ........................ G03B 17/48; G03B 13/24; H04N 5/225
(52) U.S. Cl. ........................ 396/429; 396/150; 396/535; 396/541; 348/64
(58) Field of Search .............................. 396/150, 152, 396/354, 429, 535, 541, 529, 373, 384; 348/64

(56) References Cited

U.S. PATENT DOCUMENTS 4,953,029 A * 8/1990 Morimoto et al. .......... 348/221
5,179,478 A * 1/1993 Aoki ........................... 358/906
5,483,584 A * 1/1996 Ishiguro ...................... 348/207
5,493,353 A * 2/1996 Chen .......................... 348/220
5,940,642 A * 8/1999 Ishiguro .................. 348/333.02
6,035,144 A * 3/2000 Gfeller ....................... 396/374
6,035,147 A * 3/2000 Kurosawa .................. 348/233
6,134,393 A * 10/2000 Melman ....................... 348/64
6,337,955 B1 * 1/2002 Shono ......................... 396/429

* cited by examiner

Primary Examiner—Alan A. Mathews
(74) Attorney, Agent, or Firm—Greenblum & Bernstein, P.L.C.

(57) ABSTRACT

An SLR camera system includes a camera body, a film back, and a digital back that are selectively attached to the camera body, the film back accommodating a light-sensitive film, the digital back having an image pick-up device, wherein the camera body includes a body mount to which an interchangeable lens is detachably attached, the body mount being guided in a direction of an optical axis of the interchangeable lens; a flange-back adjusting mechanism which moves the body mount in the optical axis direction to vary a position of a focal plane formed through the interchangeable lens so as to adjust a flange back; a focusing-screen drive mechanism which moves a focusing screen of the camera body along an optical axis of a finder optical system; and an eyepiece drive mechanism which moves an eyepiece along an optical axis.

23 Claims, 8 Drawing Sheets

SLR CAMERA WHICH CAN SELECTIVELY UTILIZE LIGHT-SENSITIVE FILM OR AN IMAGE PICK-UP DEVICE

BACKGROUND OF THE INVENTION

1. Field of the Invention

The present invention relates to an SLR camera using light-sensitive film or an electronic image pick-up device so that object images can be taken as latent images on the light-sensitive film or as digital images using the image pick-up device, which can be stored in a recording medium such as a floppy disk or a flash memory.

2. Description of the Related Art

Roll-film SLR cameras using an interchangeable film back which are designed so that different types of film (e.g., 70 mm wide film—either 120 or 220 roll-film, negative film or positive film) can be selectively used are known in the art. In this type of camera, if an image pick-up device (e.g., a CCD image sensor) can be positioned so that the sensitive surface thereof coincides with the focal plane of the camera body, the camera can be used as digital camera. Accordingly, a digital back (CCD back) has been proposed in which an image pick-up device (e.g., a CCD image sensor) is provided, instead of a light-sensitive film, so that the camera can be used as a digital camera when the digital back is attached to the camera body.

The digital back must be provided in front of the image pick-up device thereof with a filter group which includes, e.g., a filter for filtering infrared rays, a low-pass filter, a protection glass for protecting the image pick-up device from dust and/or another filter or filters. On the other hand, it is necessary for an exposed front surface (light-sensitive surface) of a strip of film to lie in a focal plane formed through the photographic lens when the film back is attached to the camera body. Due to this conventional structure, if the digital back is attached to the camera body instead of the film back, it is difficult to arrange the sensitive surface of the image pick-up device to be positioned in the focal plane. This is because the sensitive surface of the image pick-up device needs to be positioned behind the focal plane by a distance corresponding to the total thickness of the aforementioned filter group positioned in front of the image pick-up device so as to prevent the filter group from interfering with the focal plane shutter provided in the camera body. If the sensitive surface of the image pick-up device is simply arranged to be positioned in the focal plane, the aforementioned filter group will definitely interfere with the focal plane shutter provided in the camera body. This problem can be prevented from occurring if the back focal distance is appropriately adjusted using a relay optical system positioned in an optical path of the photographic lens. However, since the fixing position of the image pick-up device in the digital back, the material of the filter group and/or the thickness of the same varies depending upon the type of the digital back attached to the camera body, it is necessary to change the relay optical system in accordance with the type of the digital back attached to the camera body, which is troublesome and costly. If the protection glass is formed so as to be extremely thin, while the other filter or filters of the filter group are positioned between the focal plane shutter and the photographic lens, such a problem is eliminated in theory. However, this is impractical.

SUMMARY OF THE INVENTION

An object of the present invention is to provide an SLR camera which can be selectively used with a film back or a digital back, wherein the aforementioned filter group, which is positioned in front of the image pick-up device provided in the digital back, does not interfere with the focal plane shutter when the digital back is attached to the camera body.

The present invention has been made based on an idea of providing an SLR camera body with a mechanism which moves the photographic lens along the optical axis thereof so as to shift a focal plane of the photographic lens to the sensitive surface of an image pick-up device provided in a digital back when the digital back is attached to the camera body.

In order to achieve the above mentioned object, according to an aspect of the present invention, an SLR camera system is provided, including a camera body; a film back and a digital back that are selectively attached to the camera body, the film back accommodating a light-sensitive film, the digital back having an image pick-up device, wherein the camera body includes a body mount to which an interchangeable lens is detachably attached, the body mount being guided in a direction of an optical axis of the interchangeable lens; a flange-back adjusting mechanism which moves the body mount in the optical axis direction to vary a position of a focal plane formed through the interchangeable lens so as to adjust a flange back; a focusing-screen drive mechanism which moves a focusing screen of the camera body along an optical axis of a finder optical system of the camera body; and an eyepiece drive mechanism which moves an eyepiece of the camera body along an optical axis thereof.

The camera can further include a controller which controls the flange-back adjusting mechanism to vary the position of the focal plane to thereby adjust the flange back; wherein the controller controls the focusing-screen drive mechanism to move the focusing screen to make a matt surface of the focusing screen coincident with an equivalent focal plane which is optically equivalent to the focal plane, and further controls the eyepiece drive mechanism to move the eyepiece to a position where sharp images focused on the focusing screen can be viewed through the eyepiece, in accordance with a type of the digital back attached to the camera body.

The focusing-screen drive mechanism and the eyepiece drive mechanism is driven so as to be associated with the flange-back adjusting mechanism.

The camera body can include a memory in which information on a position of a film surface of the light-sensitive film for when the film back attached to the camera body is stored.

In an embodiment, the controller controls the flange-back adjusting mechanism to make the focal plane coincident with a film surface of the light-sensitive film when the film back is attached to the camera body. The controller controls the flange-back adjusting mechanism to make the focal plane coincident with a sensitive surface of the image pick-up device when the digital back is attached to the camera body.

In an embodiment, the controller starts controlling the flange-back adjusting mechanism to vary the position of the focal plane immediately after the power of the camera body is turned ON.

In an embodiment, the controller starts controlling the flange-back adjusting mechanism to vary the position of the focal plane immediately after either the film back or the digital back is attached to the camera body.

In an embodiment, the flange-back adjusting mechanism includes a rack for moving the body mount in the optical axis direction of the interchangeable lens, and a drive motor for moving the body mount forwardly and rearwardly in the optical axis direction of the interchangeable lens via the rack.

According to another aspect of the present invention, an SLR camera system is provided, including a camera body; a film back and a digital back that are selectively attached to the camera body, the film back accommodating a light-sensitive film, the digital back having an image pick-up device, wherein the camera body includes a body mount to which an interchangeable lens is detachably attached, the body mount being guided in a direction of an optical axis of the interchangeable lens; a finder unit which is attached to the camera body and includes a focusing screen, an erecting optical system and an eyepiece; a flange-back adjusting mechanism which moves the body mount in the optical axis direction to vary a position of a focal plane formed through the interchangeable lens so as to adjust a flange back; and a finder-unit drive mechanism which moves the finder unit along a finder optical axis which extends from a quick-return mirror of the camera body to the erecting optical system.

The camera can further include a controller which controls the flange-back adjusting mechanism to vary the position of the focal plane to thereby adjust the flange back, and further controls the finder-unit drive mechanism to move the focusing screen along the finder optical axis to make a matt surface of the focusing screen coincident with an equivalent focal plane which is optically equivalent to the focal plane.

The finder-unit drive mechanism is driven so as to be associated with the flange-back adjusting mechanism.

The camera body can include a memory in which information on a position of a film surface of the light-sensitive film for when the film back attached to the camera body is stored.

In an embodiment, the controller controls the flange-back adjusting mechanism to make the focal plane coincident with a film surface of the light-sensitive film when the film back is attached to the camera body. The controller controls the flange-back adjusting mechanism to make the focal plane coincident with a sensitive surface of the image pick-up device when the digital back is attached to the camera body.

In an embodiment, the controller starts controlling the flange-back adjusting mechanism to vary the position of the focal plane immediately after the power of the camera body is turned ON.

In an embodiment, the controller starts controlling the flange-back adjusting mechanism to vary the position of the focal plane immediately after either the film back or the digital back is attached to the camera body.

In an embodiment, the flange-back adjusting mechanism includes a rack for moving the body mount in the optical axis direction of the interchangeable lens, and a drive motor for moving the body mount forwardly and rearwardly in the optical axis direction of the interchangeable lens via the rack.

Preferably, the digital back includes a transmitting device for transmitting information on a position of a sensitive surface of the image pick-up device to the controller.

The digital back can include a memory in which the information on a position of a sensitive surface of the image pick-up device used to control the flange-back adjusting mechanism is stored, and a controller which receives the positional information to control the drive motor in accordance with the positional information.

The image pick-up device is preferably a CCD image sensor.

In an embodiment, the digital back further includes a filter group fixedly positioned in front of the image pick-up device.

In an embodiment, the camera body includes a sliding cylinder guided in the optical axis direction and having an axis coincident with the optical axis, the body mount being formed integrally with a front end of the sliding cylinder, wherein the flange-back adjusting mechanism moves the body mount by moving the sliding cylinder in the optical axis direction.

In an embodiment, the camera body includes a sliding cylinder guided in the optical axis direction and having an axis coincident with the optical axis, the body mount being formed integrally with a front end of the sliding cylinder; wherein the rack is formed on the sliding cylinder; and wherein the drive motor includes a pinion on a drive shaft thereof, the pinion engaging with the rack.

According to another aspect of the present invention, an SLR camera system is provided, including a camera body to which a film back and a digital back are selectively attached, the film back accommodating a light-sensitive film, the digital back having an image pick-up device, wherein the camera body includes a body mount to which an interchangeable lens is detachably attached, the body mount being guided in a direction of an optical axis of the interchangeable lens; a first adjusting mechanism which moves the body mount in the optical axis direction to adjust a flange back; a second adjusting mechanism which moves an eyepiece of the camera body along an optical axis thereof; a third adjusting mechanism which moves a focusing screen of the camera body along an optical axis of a finder optical system of the camera body, the third mechanism being linked to the first mechanism and the second mechanism via a first gear group and a second gear group, respectively; and a controller which controls the first, second and third mechanisms to vary a position of the focal plane to thereby adjust the flange back, to move the eyepiece to a position where sharp images focused on the focusing screen can be viewed through the eyepiece, and to move the focusing screen to make a matt surface of the focusing screen coincident with an equivalent focal plane which is optically equivalent to the focal plane, respectively, in accordance with a type of the digital back attached to the camera body.

The present disclosure relates to subject matter contained in Japanese Patent Application No.11-188709 (filed on Jul. 2, 1999) which is expressly incorporated herein by reference in its entirety.

BRIEF DESCRIPTION OF THE DRAWINGS

The present invention will be described below in detail with reference to the accompanying drawings in which similar elements are indicated by similar reference numerals, and wherein.

DESCRIPTION OF THE PREFERRED EMBODIMENTS

FIGS. 1 through 4 show the first embodiment of an SLR camera system according to the present invention. The SLR camera system includes a camera body 10 and a interchangeable photographic lens 19. The camera body 10 is provided at the front thereof with a body mount 13 to which the interchangeable lens 19 is detachably mounted. The camera body 10 is provided at the rear thereof with a back mount 14 to which a digital back (CCD back) 21 and a film back 32 (see FIG. 3) are selectively attached. The camera body 10 is provided therein in front of a focal plane (image plane) 20 with a focal plane shutter 11. The camera body 10 is further provided therein in front of the focal plane 20 with a quick-return mirror 12 (see FIG. 2). The quick-return mirror 12 reflects object light upwardly to a finder optical system when in an initial position, and allows the object light to proceed towards to the focal plane 20 when in a raised or retracted position. The finder optical system of the camera body 10 includes a focusing screen 15 positioned above the quick-return mirror 12, a pentagonal prism (erecting optical system) 16 positioned above the focusing screen 15 and an eyepiece 17 positioned behind the pentagonal prism 16.

Figure 3:
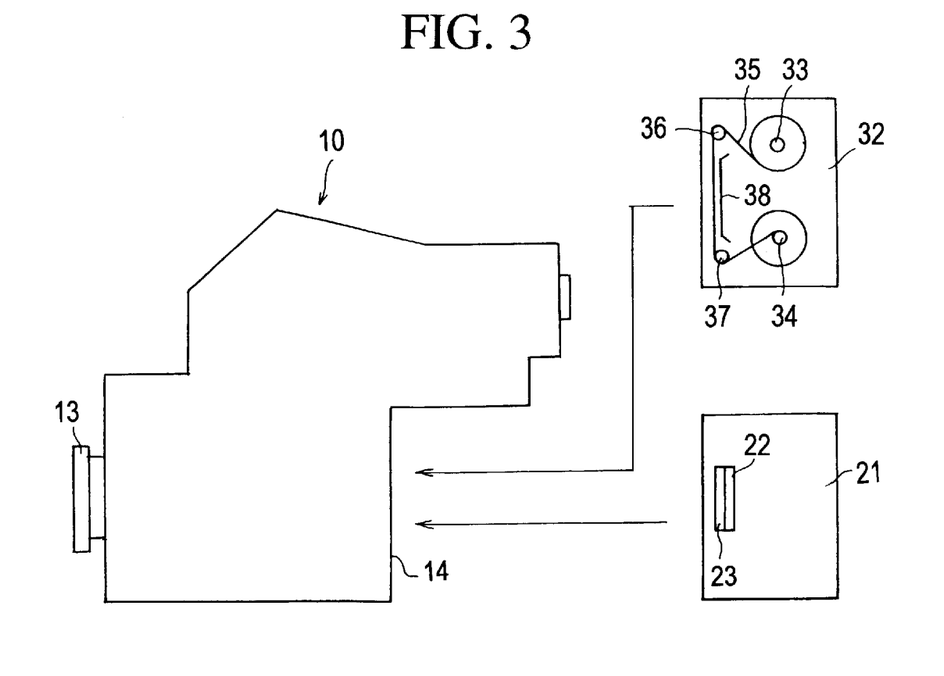
FIG. 3 is an explanatory view of the SLR camera system shown in FIG. 1, showing that the SLR camera system can selectively utilize a film back or a digital back.
Figure 4:
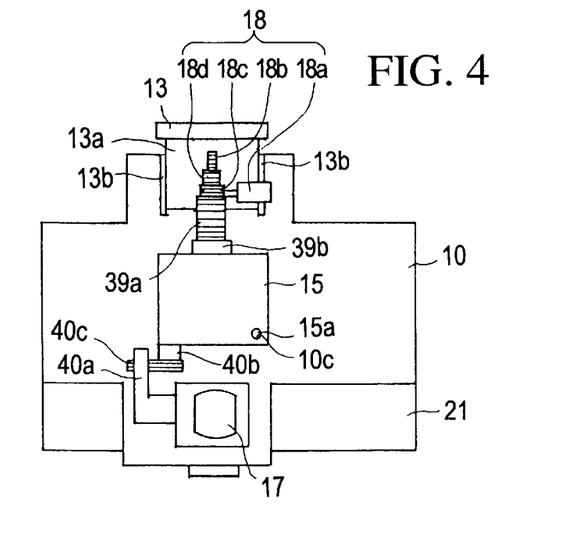
FIG. 4 is a cross sectional view of the SLR camera system shown in FIG. 1, taken along the IV—IV line in FIG. 1, as viewed in the direction of the appended arrows.
Figure 5:
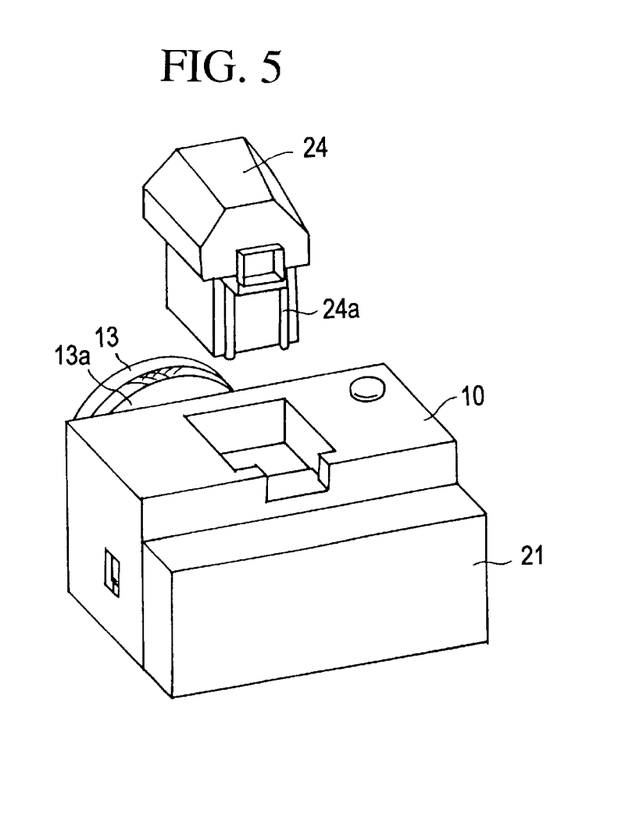
FIG. 5 is a schematic perspective view of the second embodiment of an SLR camera system according to the present invention, showing a state where a finder unit is detached from the camera body.
Figure 6:
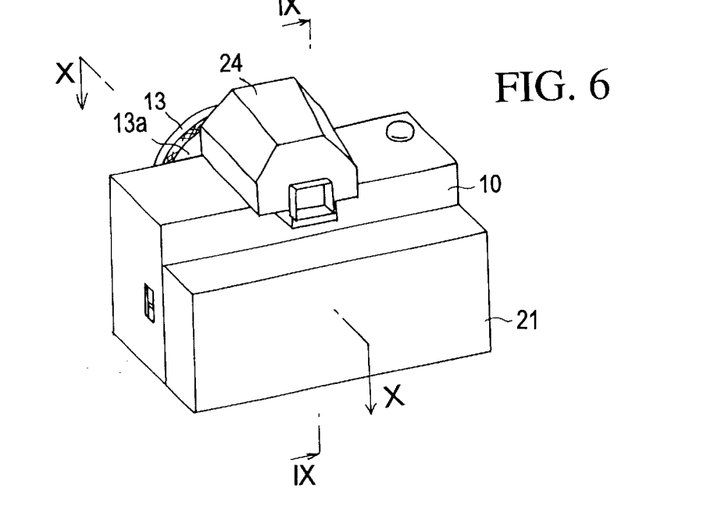
FIG. 6 is a schematic perspective view of the second embodiment of the SLR camera system shown in FIG. 5, showing a state where the finder unit is attached to the camera body.
Figure 7:
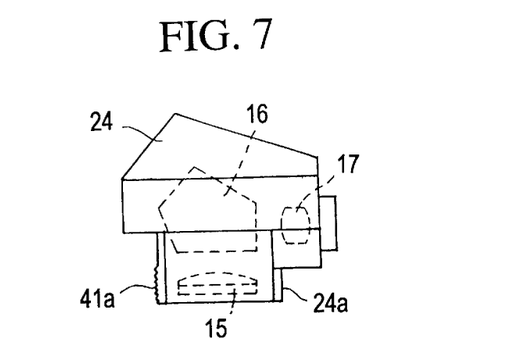
FIG. 7 is a side elevational view of the finder unit shown in FIGS. 5 and 6.
Figure 8:
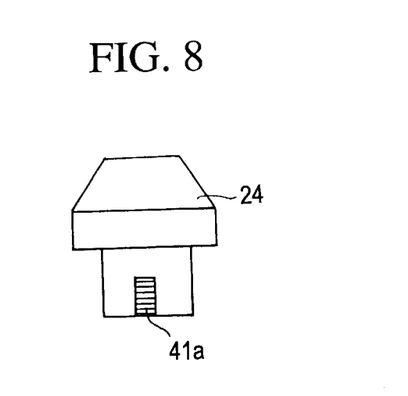
FIG. 8 is a front elevational view of the finder unit shown in FIGS. 5 and 6.
Figure 9:
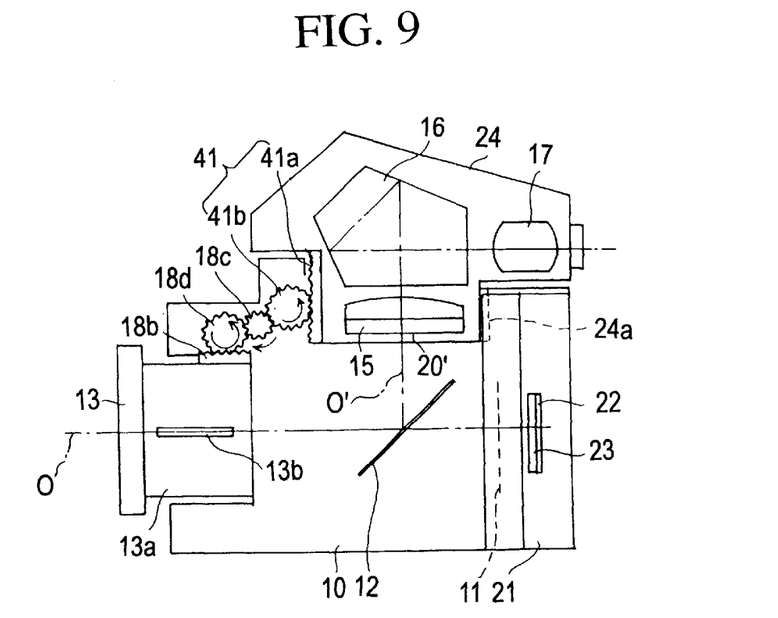
FIG. 9 is a cross sectional view of the SLR camera system shown in FIGS. 5 and 6, taken along the IX—IX line in FIG. 6, looking in the direction of the appended arrows.
Figure 10:
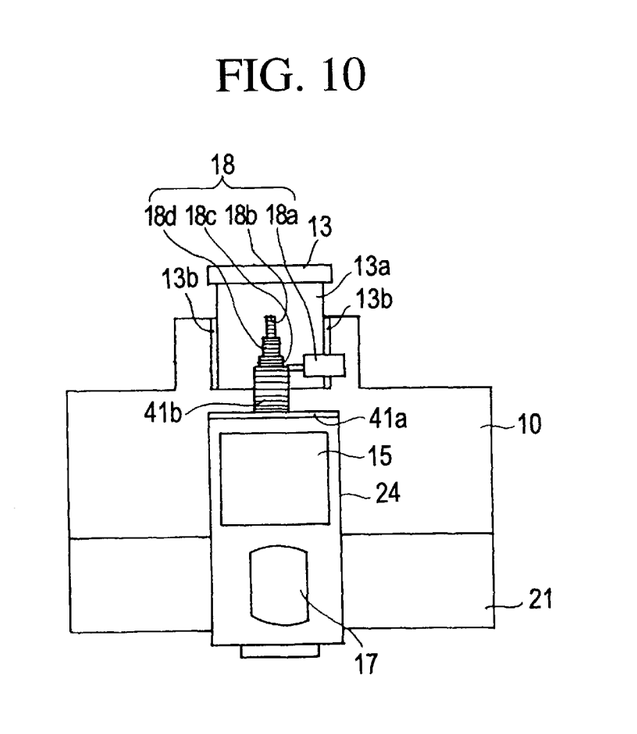
FIG. 10 is a cross sectional view of the SLR camera system shown in FIGS. 5 and 6, taken along the X—X line in FIG. 6, looking in the direction of the appended arrows.
Figure 11:
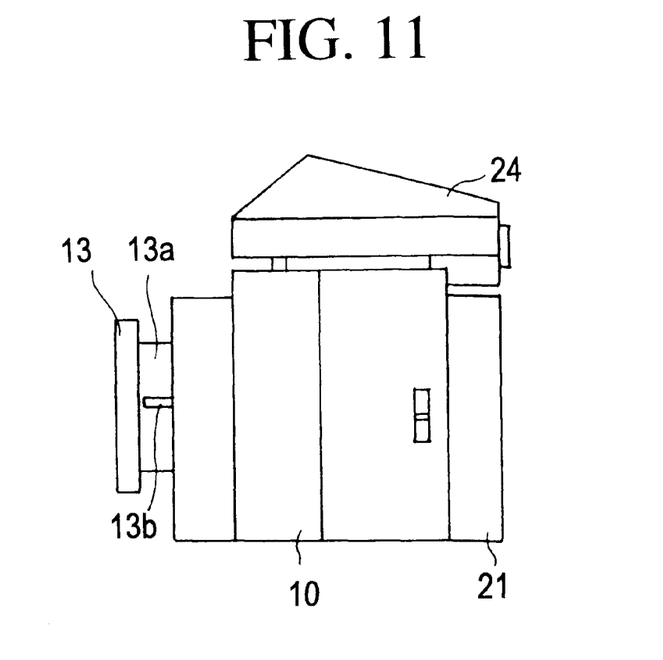
FIG. 11 is a side elevational view of the second embodiment of the SLR camera system shown in FIGS. 5 and 6, showing a movement position of a body mount of the camera body.
Figure 12:
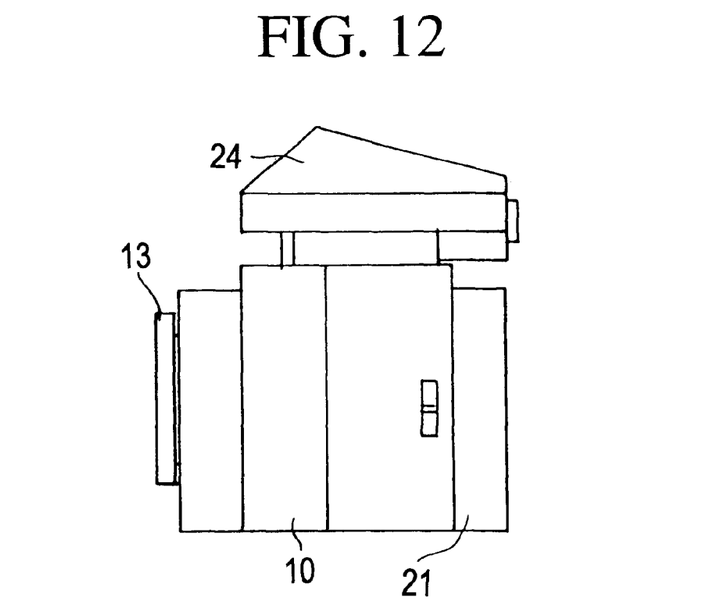
FIG. 12 is a side elevational view of the second embodiment of the SLR camera system shown in FIGS. 5 and 6, showing a movement position of the body mount of the camera body.
Figure 13:
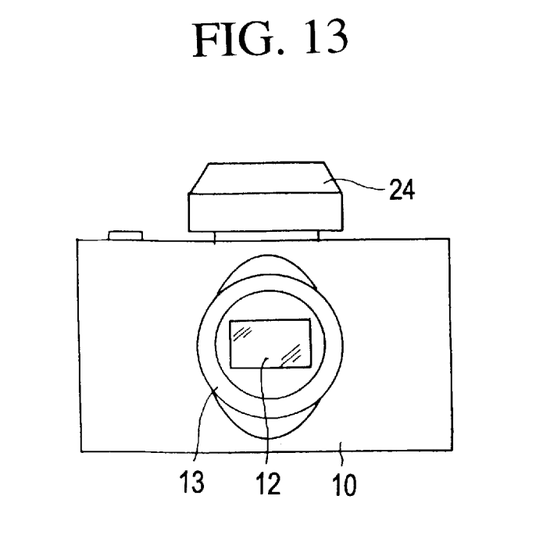
FIG. 13 is a front elevational view of the second embodiment of the SLR camera system shown in FIGS. 5 and 6.

The film back 32 and the digital back 21 can be selectively attached to the back mount 14 of the camera body 10. The film back 32 is provided therein with a roll-film feed spool 33 and a take-up spool 34. Roll-film 35 on the roll-film feed spool 33 is wound on the take-up spool 34 via guide rollers 36 and 37. The film back 32 is provided, behind a plane in which the guide rollers 36 and 37 lie, with a pressure plate 38. When the film back 32 is attached to the back mount 14 of the camera body 10, part of the roll-film 35 which is positioned immediately in front of the pressure plate 38 lies in the focal plane 20 located in the camera body 10. By controlling the focal plane shutter 11 to operate, light of the object image that is passed through the interchangeable lens 19 is exposed on the aforementioned part of the roll-film 35 which is positioned immediately in front of the pressure plate 38.

The digital back 21 is provided therein with a CCD image sensor (e.g., an image pick-up device) 22. The digital back 21 is provided immediately in front of a sensitive surface 22a of the CCD image sensor 22 with a filter group 23 which is composed of, e.g., a filter for filtering infrared rays, a low-pass filter, a protection glass for protecting the image pick-up device from dust and/or the like. If the thickness of the filter group 23 is extremely small, the sensitive surface 22a can be precisely positioned to coincide with the focal plane 20. However, in practice, the thickness of the filter group 23 cannot be made so small. If the sensitive surface 22a is made to coincide with the focal plane 20, the filter group 23 projects forwardly from the focal plane 20 since the filter group 23 is thick, which causes the filter group 23 to interfere with the focal plane shutter 11 when the digital back 21 is attached to the back mount 14.

Figure 1:
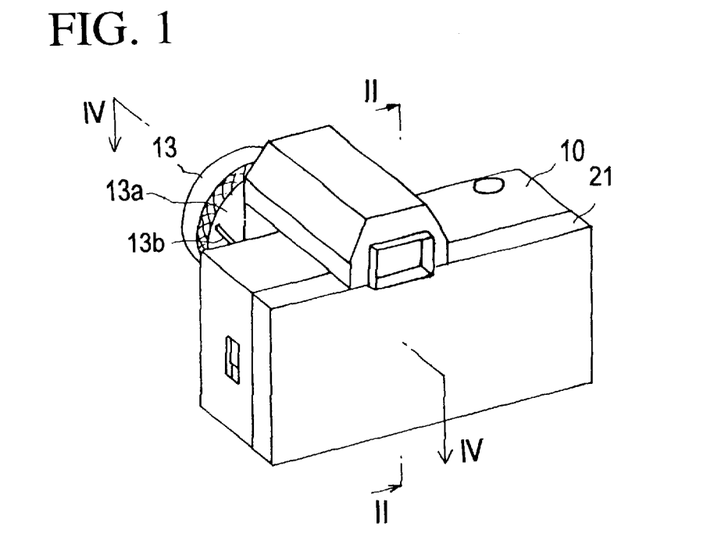
FIG. 1 is a schematic perspective view of the first embodiment of an SLR camera system according to the present invention.
Figure 2:
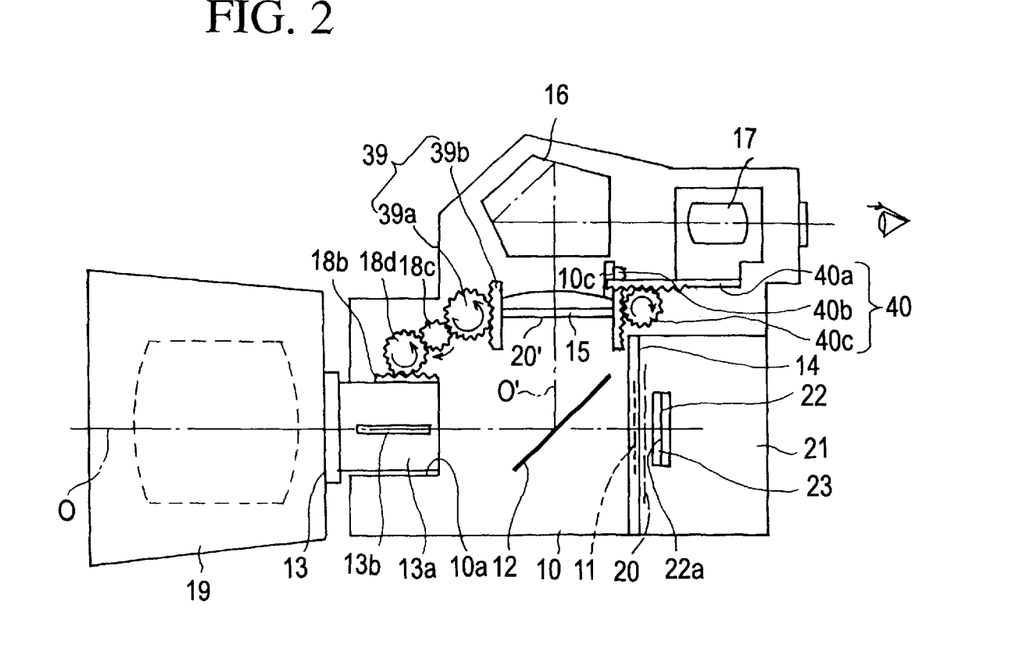
FIG. 2 is a longitudinal cross sectional view of the SLR camera system shown in FIG. 1, taken along the II—II line in FIG. 1, looking in the direction of the appended arrows.

To prevent such a problem from occurring, the filter group 23 is fixedly disposed at a position where it does not interfere with the focal plane shutter 11, while the camera body 10 is provided therein with a mechanism for moving the photographic lens 19 as a whole along an optical axis O thereof to adjust a flange back (flange focal distance) (the distance from the front face of the body mount 13 to the focal plane 20) of the camera body 10, namely, to make the focal plane 20 coincident with the sensitive surface 22a of the CCD image sensor 22. FIG. 2 shows a state of the first embodiment of the SLR camera system with the digital back 21 being attached to the camera body 10, wherein the flange back has not yet been adjusted, so that the focal plane 20 is not coincident with the sensitive surface 22a of the CCD image sensor 22.

The camera body 10 is provided therein with a flange-back adjusting mechanism (flange-focal-distance adjusting mechanism/first adjusting mechanism) 18 which drives the body mount 13, to which the interchangeable lens 19 is attached, in the direction of the optical axis O. The body mount 13 is formed integral at the front end of a sliding cylinder 13a so that the front face of the body mount 13 extends perpendicular to the optical axis O. The sliding cylinder 13a has an axis coincident with the optical axis O and is guided in the direction of the optical axis O. The sliding cylinder 13a is positioned within a circular aperture 10a formed at the front of the camera body 10 to be slidable therein in the direction of the optical axis O. The sliding cylinder 13a is provided on right and left sides thereof with two parallel guide rails 13b, respectively, each extending parallel to the optical axis O (see FIGS. 2 and 3). The sliding cylinder 13a is further provided on top thereof with a rack 18b which extends parallel to the optical axis O (see FIGS. 2 and 3). Each sliding guide rail 13b is slidably fitted in a corresponding guide groove (not shown) which is formed on the camera body 10 within the circular aperture 10a to extend parallel to the optical axis O. Therefore, the sliding cylinder 13a is allowed to move in the direction of the optical axis O but is prevented from rotating about the optical axis O by the two parallel guide rails 13b and the corresponding two guide grooves. The camera body 10 is provided therein with a drive motor 18a having a pinion 18c on a drive shaft thereof. The pinion 18c meshes with a pinion 18d which meshes with the rack 18b. Therefore, if the drive motor 18a rotates, the rack 18b moves forwardly or rearwardly via the pinions 18c and 18d, so that the interchangeable lens 19 moves forwardly or rearwardly along the optical axis O together with the body mount 13. Accordingly, the focal plane 20 can be brought into coincident with the sensitive surface 22a by controlling the drive motor 18a.

If the interchangeable lens 19 moves forwardly or rearwardly along the optical axis O, an equivalent focal plane 20' (which is optically equivalent to the focal plane 20) formed above the quick-return mirror 12 in a finder optical path formed via the quick-return mirror 12 also moves. Considering this fact, the camera body 10 is provided therein with a focusing-screen drive mechanism (third adjusting mechanism) 39 and an eyepiece drive mechanism (second adjusting mechanism) 40. The focusin-screen drive mechanism 39 moves a focusing screen 15, which is positioned above the quick-return mirror 12, along an optical axis O' in a direction perpendicular to the optical axis O of the interchangeable lens 19 to make the matt surface of the focusing screen 15 coincident with the equivalent focal plane 20'. The eyepiece drive mechanism 40 moves the eyepiece 17 along an optical axis thereof to a position where sharp images focused on the focusing screen 15 can be viewed through the eyepiece 17. The focusing screen 15 is provided with a guide hole 15a which extends in the vertical direction of the camera body 10 in a direction perpendicular to the direction of the optical axis O (see FIG. 4). The focusing screen 15 is further provided at the front and rear ends thereof with front and rear racks 39b and 40b, respectively, each extending in a direction parallel to the optical axis O' which extends vertically from the quick-return mirror 12 in the finder optical path. The camera body 10 is provided therein with a guide shaft 10c which is fixed to the camera body 10. The guide shaft 10c extends parallel to the optical axis O' and is slidably fitted in the guide hole 15a of the focusing screen 15 to allow the focusing screen 15 to move only in the direction of the optical axis O'. The front rack 39b meshes with a pinion 39a which meshes with the pinion 18c of the drive motor 18a. Therefore, if the drive motor 18a is actuated to rotate the pinion 18c, the body mount 13 moves in the direction of the optical axis O via the pinion 18d, the rack 18b and the sliding cylinder 13a, and at the same time the front rack 39b moves in the direction of the optical axis O'. This causes the focusing screen 15 to move in the direction of the optical axis O' by the same distance that the interchangeable lens 19 moves, so that the matt surface of the focusing screen 15 coincides with the equivalent focal plane 20'.

The eyepiece 17 is provided with a guiding device (not shown) wherein the eyepiece 17 can move only in the direction of an optical axis thereof. The eyepiece 17 is further provided with a rack 40a which extends parallel to the optical axis of the eyepiece 17. The rack 40a meshes with a pinion 40c which meshes with the rear rack 40b. Therefore, if the focusing screen 15 moves while the body mount 13 moves, the eyepiece 17 also moves in the direction of the optical axis thereof by the same distance that the interchangeable lens 19 moves, so that the eyepiece 17 moves to a position where sharp images focused on the focusing screen 15 can be viewed through the eyepiece 17.

Figure 14:
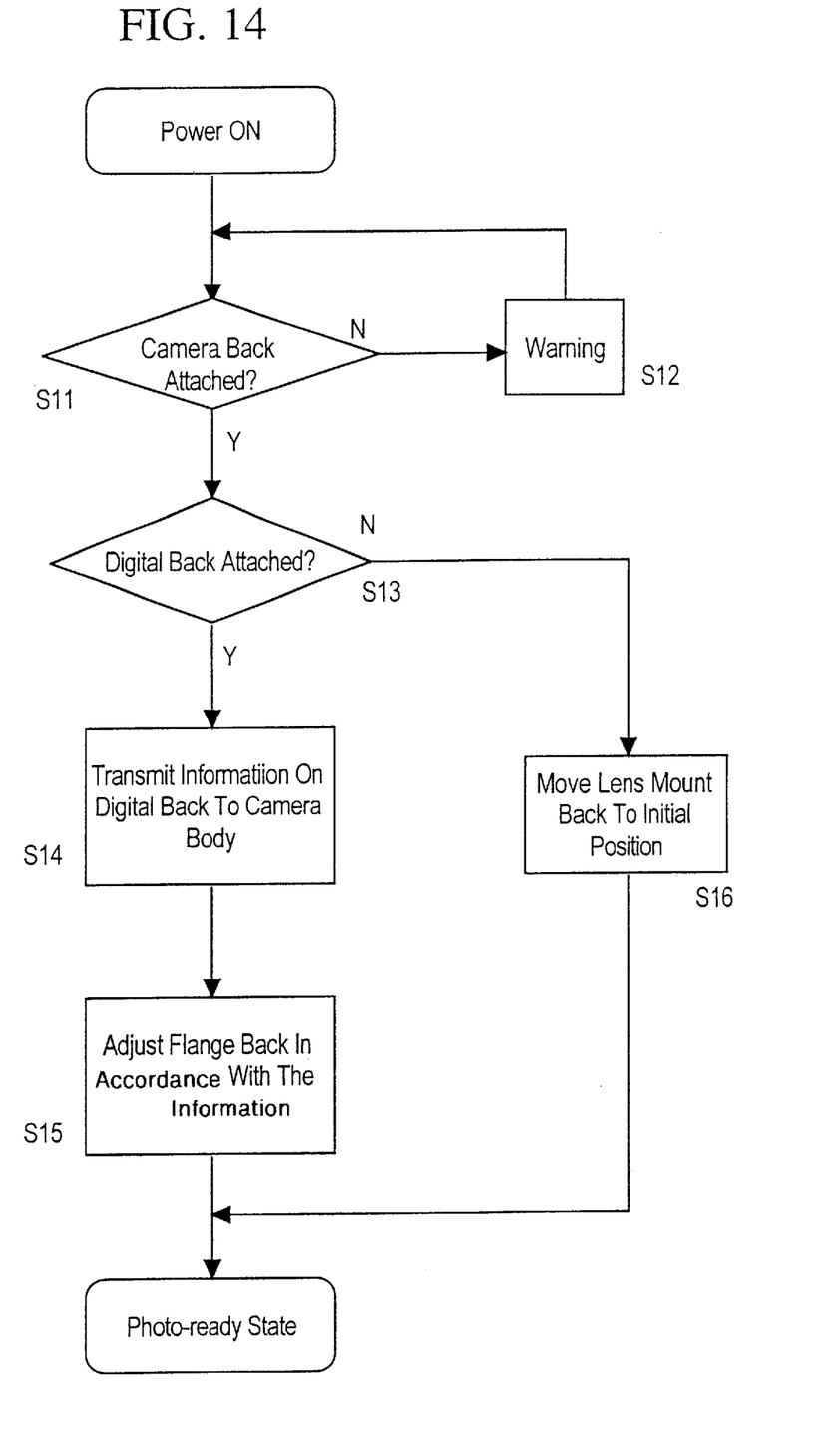
FIG. 14 is a flow chart of fundamental operations of each of the first and second embodiments of the SLR camera systems according to the present invention.

FIG. 14 is a flow chart of fundamental operations of the first embodiment of the SLR camera system which are performed from a moment the digital back 21 is attached to the camera body 10 to a moment the camera body 10 comes into a photo-ready state. These fundamental operations will be hereinafter discussed in detail with reference to FIG. 14.

If a power switch 28 (see FIG. 15) provided on the camera body 10 is turned ON, it is determined whether a camera back (the film back 32 or the digital back 21) has been attached to the camera body 10 (step S11). Control proceeds to step S13 if the camera back has been attached to the camera body 10 or proceeds to step S12 to warn the user by a known manner (e.g., by generating an audible warning signal or indicating a warning mark on an LCD panel provided on the camera body) that neither the film back 32 nor the digital back 21 has been attached to the camera body 10. At the same time, the drive motor 18a is controlled to move the lens mount 13 to an initial position (at which the focal plane 20 coincides with part of the roll-film 35 which is positioned immediately in front of the pressure plate 38) in accordance with position information (initial position information) of a film surface (the surface of a film frame to be exposed) for when the film back 32 is attached to the camera body 10. This information is prestored in a memory 42 (see FIG. 15) provided in the camera body 10. Subsequently control returns to step S11.

Figure 15:
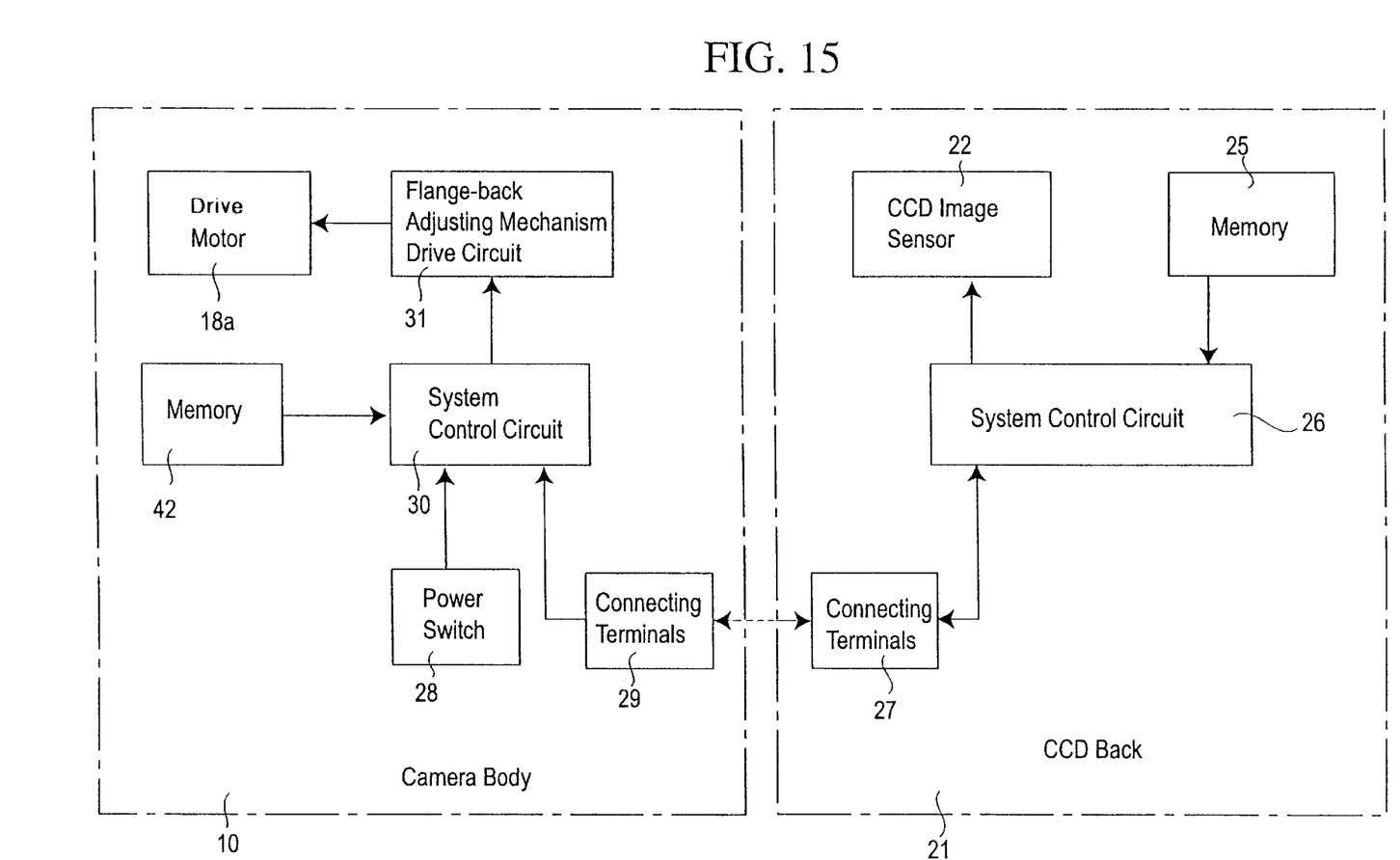
FIG. 15 is a block diagram of fundamental elements of the camera body of each of the first and second embodiments of the SLR camera system with the digital back attached to the camera body.

At step S13 it is determined whether the camera back attached to the camera body 10 is the digital back 21. Control proceeds to step S14 if the attached camera back is the digital back 21, or proceeds to step S16 if the attached camera back is the film back 32. At step S14 information on the digital back 21 that is prestored in a memory 25 (see FIG. 15) provide d in the digital back 21 is transmitted to the camera body 10. This information on the digital back 21 includes positional data of the filter group 23 and the CCD image sensor 22. Subsequently, at step S15, the flange-back adjusting mechanism 18 is driven to move the body mount 13 to adjust the flange back of the camera body 10, in accordance with the received information on the digital back 21. After the flange-back adjusting operation is completed, the camera body 10 comes into a photo-ready state. If the attached camera back is the film back 32 at step S16, the drive motor 18a is controlled to move the lens mount 13 back to the aforementioned initial position, if the lens mount 13 is not at the initial position, in accordance with information (initial position information) prestored in the memory 42. In other words, at step S16 it is confirmed that the lens mount 13 is at the initial position. Subsequently, the camera body 10 comes into a photo-ready state. operations of the firs t embodiment of the SLR camera system with the digital back 21 being attached to the camera body 10 will be hereinafter discussed with reference to the block diagram shown in FIG. 15. As shown in FIG. 15, the camera body 10 is provided therein with a system control circuit (controller) 30 (e.g., a microcomputer). Similarly, the digital back 21 is provided with a system control circuit 26 (e.g., a microcomputer). The camera body 10 is further provided therein with a flange-back adjusting mechanism drive circuit 31. When the camera body 10 has the digital back 21 attached thereto, connecting terminals 27 of the digital back 21, which are electrically connected to the system control circuit 26, are in contact with corresponding connecting terminals 29 of the camera body 10, which are electrically connected to the system control circuit 30, to make it possible to transmit and receive signals between the camera body 10 and the digital back 21. Information on the digital back 21 that is prestored in the memory 25 is transmitted to the camera body 10 via the system control circuit (transmitting device/controller) 26. The information on the digital back includes information on the position of the sensitive surface 22a of the CCD image sensor (image pick-up device) 22. This information is utilized to control the flange-back adjusting mechanism 18. Upon receiving this information via the connecting terminals 27 and 29, the system control circuit 30 of the camera body 10 transmits a signal to the flange-back adjusting mechanism drive circuit 31 for controlling the drive motor 18a. The flange-back adjusting mechanism drive circuit 31 controls the drive motor 18a to adjust the flange back in accordance with the signal received from the system control circuit 30. After this flange-back adjusting operation, the camera body 10 enters into a photo-ready state.

FIGS. 5 through 13 show the second embodiment of the SLR camera system according to the present invention. In this embodiment, the finder optical system, which includes the focusing screen 15, the pentagonal prism 16 and the eyepiece 17, is entirely arranged in a finder unit 24 which is independent of the camera body 10. The positions of the focusing screen 15, the pentagonal prism 16 and the eyepiece 17 are fixed to one another in the finder unit 24. The finder unit 24 is provided on front and rear surfaces thereof with a rack 41a and a guide rail 24a, respectively, each extending in a direction parallel to the optical axis O', which extends vertically with respect to the optical axis O from the quick-return mirror 12 in the finder optical path. The rack 41a meshes with a pinion 41b which meshes with the pinion 18c of the drive motor 18a. The rack 41a and the pinion 41b constitute a finder-unit drive mechanism 41. A flange-back adjusting mechanism 18 which drives the body mount 13 in the direction of the optical axis O in the second embodiment of the SLR camera system is identical to that of the first embodiment of the SLR camera system. Therefore, if the drive motor 18a is actuated to rotate the pinion 18c, the body mount 13 moves in the direction of the optical axis O via the pinion 18d, the rack 18b and the sliding cylinder 13a and at the same time the rack 41a moves in the direction of the optical axis O'. This causes the finder unit 24, which includes the focusing screen 15, to move in the direction of the optical axis O', which makes it possible to make the matt surface of the focusing screen 15 coincident with the equivalent focal plane 20' (see FIGS. 11 and 12).

In the second embodiment of the SLR camera system, since the finder optical system is provided as a unit (the finder unit 24), it is not necessary for the camera body 10 to be provided with a mechanism corresponding to the eyepiece drive mechanism 40 in the first embodiment, which moves the eyepiece 17 along the optical axis thereof to adjust the optical path length between the focusing screen 15 and the eyepiece 17. Therefore, according to the second embodiment of the SLR camera system, the structure of the camera body 10 is simplified.

As can be understood from the foregoing, according to an SLR camera which can be selectively used with a film back or a digital back according to the present invention, since the flange back is adjusted by a mechanism provided in the camera body, not in the digital back, the digital back whose design is not limited by the type of the image pick-up device and/or the fixing position thereof, which is therefore designed with a high degree of freedom, can be used. Furthermore, since it is not necessary for the SLR camera system to be provided with a special relay optical system, it is not necessary to change a relay optical system depending on the type of the digital back attached to the camera body, which contributes to a reduction of the production cost and an improvement on the operation of the SLR camera system.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An SLR camera system comprising:
a camera body;
a film back and a digital back that are selectively attached to said camera body, said film back accommodating a light-sensitive film, said digital back having an image pick-up device, wherein said camera body comprises a body mount to which an interchangeable lens is detachably attached, said body mount being guided in a direction of an optical axis of said interchangeable lens;
a flange-back adjusting mechanism which moves said body mount in said optical axis direction to vary a position of a focal plane formed through said interchangeable lens so as to adjust a flange back;
a focusing-screen drive mechanism which moves a focusing screen of said camera body along an optical axis of a finder optical system of said camera body; and
an eyepiece drive mechanism which moves an eyepiece of said camera body along an optical axis thereof.

2. The SLR camera system according to claim 1, said camera further comprising a controller which controls said flange-back adjusting mechanism to vary said position of said focal plane to thereby adjust said flange back; wherein said controller controls said focusing-screen drive mechanism to move said focusing screen to make a matt surface of said focusing screen coincident with an equivalent focal plane which is optically equivalent to said focal plane, and further controls said eyepiece drive mechanism to move said eyepiece to a position where sharp images focused on said focusing screen can be viewed through said eyepiece, in accordance with a type of said digital back attached to said camera body.

3. The SLR camera system according to claim 1, wherein each of said focusing-screen drive mechanism and said eyepiece drive mechanism is driven so as to be associated with said flange-back adjusting mechanism.

4. The SLR camera system according to claim 1, wherein said camera body comprises a memory in which information on a position of a film surface of said light-sensitive film for when said film back attached to said camera body is stored.

5. The SLR camera system according to claim 1, further comprising a controller that controls said flange-back adjusting mechanism to make said focal plane coincident with a film surface of said light-sensitive film when said film back is attached to said camera body, and
wherein said controller controls said flange-back adjusting mechanism to make said focal plane coincident with a sensitive surface of said image pick-up device when said digital back is attached to said camera body.

6. The SLR camera system according to claim 1, further comprising a controller that starts controlling said flange-back adjusting mechanism to vary said position of said focal plane immediately after the power of said camera body is turned ON.

7. The SLR camera system according to claim 1, further comprising a controller that starts controlling said flange-back adjusting mechanism to vary said position of said focal plane immediately after one of said film back and said digital back is attached to said camera body.

8. The SLR camera system according to claim 1, wherein said flange-back adjusting mechanism comprises:
a rack for moving said body mount in said optical axis direction of said interchangeable lens; and a drive motor for moving said body mount forwardly and rearwardly in said optical axis direction of said interchangeable lens via said rack.

9. The SLR camera system according to claim 1, wherein said image pick-up device comprises a CCD image sensor.

10. The SLR camera system according to claim 1, wherein said digital back further comprises a filter group fixedly positioned in front of said image pick-up device.

11. The SLR camera system according to claim 1, wherein said camera body comprises a sliding cylinder guided in said optical axis direction of said body mount and having an axis coincident with said body mount optical axis, said body mount being formed integrally with a front end of said sliding cylinder, wherein said flange-back adjusting mechanism moves said body mount by moving said sliding cylinder in said optical axis direction.

12. An SLR camera system comprising:

a camera body;

a film back and a digital back that are selectively attached to said camera body, said film back accommodating a light-sensitive film, said digital back having an image pick-up device, wherein said camera body comprises a body mount to which an interchangeable lens is detachably attached, said body mount being guided in a direction of an optical axis of said interchangeable lens;

a finder unit which is attached to said camera body and comprises a focusing screen, an erecting optical system and an eyepiece;

a flange-back adjusting mechanism which moves said body mount in said optical axis direction to vary a position of a focal plane formed through said interchangeable lens so as to adjust a flange back; and a finder-unit drive mechanism which moves said finder unit along a finder optical axis which extends from a quick-return mirror of said camera body to said erecting optical system.

13. The SLR camera system according to claim 12, further comprising a controller which controls said flange-back adjusting mechanism to vary said position of said focal plane to thereby adjust said flange back, and further controls said finder-unit drive mechanism to move said focusing screen along said finder optical axis to make a matt surface of said focusing screen coincident with an equivalent focal plane which is optically equivalent to said focal plane.

14. The SLR camera system according to claim 12, wherein said finder-unit drive mechanism is driven so as to be associated with said flange-back adjusting mechanism.

15. The SLR camera system according to claim 12, wherein said camera body comprises a memory in which information on a position of a film surface of said light-sensitive film for when said film back attached to said camera body is stored.

16. The SLR camera system according to claim 12, further comprising a controller that controls said flange-back adjusting mechanism to make said focal plane coincident with a film surface of said light-sensitive film when said film back is attached to said camera body; and wherein said controller controls said flange-back adjusting mechanism to make said focal plane coincident with a sensitive surface of said image pick-up device when said digital back is attached to said camera body.

17. The SLR camera system according to claim 12, further comprising a controller that starts controlling said flange-back adjusting mechanism to vary said position of said focal plane immediately after the power of said camera body is turned ON.

18. The SLR camera system according to claim 12, further comprising a controller that starts controlling said flange-back adjusting mechanism to vary said position of said focal plane immediately after one of said film back and said digital back is attached to said camera body.

19. The SLR camera system according to claim 12, wherein said flange-back adjusting mechanism comprises:

a rack for moving said body mount in said optical axis direction of said interchangeable lens; and a drive motor for moving said body mount forwardly and rearwardly in said optical axis direction of said interchangeable lens via said rack.

20. The SLR camera system according to claim 12, wherein said digital back comprises a transmitting device that transmits information on a position of a sensitive surface of said image pick-up device to a controller.

21. The SLR camera system according to claim 19, wherein said digital back comprises:

a memory in which the information on a position of a sensitive surface of said image pick-up device used to control said flange-back adjusting mechanism is stored; and a controller which receives said positional information to control said drive motor in accordance with said positional information.

22. The SLR camera system according to claim 19, wherein said camera body comprises a sliding cylinder guided in said optical axis direction of said body mount and having an axis coincident with said body mount optical axis, said body mount being formed integrally with a front end of said sliding cylinder;

wherein said rack is formed on said sliding cylinder; and wherein said drive motor comprises a pinion on a drive shaft thereof, said pinion engaging with said rack.

23. An SLR camera system comprising:

a camera body to which a film back and a digital back are selectively attached, said film back accommodating a light-sensitive film, said digital back having an image pick-up device, wherein said camera body comprises a body mount to which an interchangeable lens is detachably attached, said body mount being guided in a direction of an optical axis of said interchangeable lens;

a first adjusting mechanism which moves said body mount in said optical axis direction to adjust a flange back;

a second adjusting mechanism which moves an eyepiece of said camera body along an optical axis thereof;

a third adjusting mechanism which moves a focusing screen of said camera body along an optical axis of a finder optical system of said camera body, said third mechanism being linked to said first mechanism and said second mechanism via a first gear group and a second gear group, respectively; and a controller which controls said first, second and third mechanisms to vary a position of said focal plane to thereby adjust said flange back, to move said eyepiece to a position where sharp images focused on said focusing screen can be viewed through said eyepiece, and to move said focusing screen to make a matt surface of said focusing screen coincident with an equivalent focal plane which is optically equivalent to said focal plane, respectively, in accordance with a type of said digital back attached to said camera body.

* * * * *